United States Patent [19]

Brown et al.

[11] Patent Number: 4,615,897

[45] Date of Patent: Oct. 7, 1986

[54] COLD WATER SOLUBLE GELATIN

[75] Inventors: James Brown, Huntington, Conn.; Peter E. Ellis, Riverdale, N.Y.; Marta J. Draper, Westport, Conn.

[73] Assignee: Nabisco Brands, Inc., Parsippany, N.J.

[21] Appl. No.: 704,785

[22] Filed: Feb. 25, 1985

[51] Int. Cl.$^4$ ............................................. A23L 1/04
[52] U.S. Cl. .................................. 426/576; 426/456
[58] Field of Search ............... 426/576, 443, 455, 456, 426/465

[56] References Cited

U.S. PATENT DOCUMENTS

| | | | |
|---|---|---|---|
| 2,803,548 | 8/1957 | Hagerty | 99/130 |
| 2,819,970 | 1/1958 | Steigmann | 99/130 |
| 2,819,971 | 1/1958 | Gunthardt | 99/130 |
| 2,841,498 | 7/1958 | Cahn et al. | 99/130 |
| 2,948,622 | 8/1960 | Cahn | 99/130 |
| 3,904,771 | 9/1975 | Donnelly | 426/576 |
| 3,927,221 | 12/1975 | Kalafatas et al. | 426/576 |
| 4,401,685 | 8/1983 | Brown et al. | 426/576 |
| 4,407,836 | 10/1983 | Bosco et al. | 426/576 |

FOREIGN PATENT DOCUMENTS 896965  4/1972  Canada ................................ 99/130

*Primary Examiner*—Jeanette Hunter
*Attorney, Agent, or Firm*—Richard Kornutik

[57] ABSTRACT

An improved cold water soluble gelatin and a process of preparing it. The improved cold water soluble gelatin is prepared by drying an aqueous solution containing water, gelatin, a hydrolyzed corn starch having a dextrose equivalent of 20–36 (preferably of the order of 26), an acid and amount of surface-active agent effective to increase dispersibility in the final product. An optional, but preferred, feature comprises holding the aqueous solution at an elevated temperature in the range for a specified period prior to the drying step, the acid being incorporated in the solution either before or after the holding period and prior to the drying step.

The cold water soluble gelatins are characterized by improved solubility and ease of dispersion in water as well as by the clarity of the gels produced therefrom.

11 Claims, No Drawings

COLD WATER SOLUBLE GELATIN

BACKGROUND OF THE INVENTION

The present invention relates to cold water soluble gelatin; and, particularly, to an improved cold water soluble gelatin product and a process for preparing it.

Gelatin is a widely used food ingredient. It has the ability to thicken or otherwise improve the texture of a variety of liquid products and also to set to a heat reversible gel which is useful in preparing products such as gelatin desserts. In products such as salad dressings, it aids in suspending particulate ingredients, and in frozen products such as ice cream it has the ability to retard the growth of ice crystals.

The art has long recognized a need for cold water soluble gelatin products. Unfortunately, it has been difficult until this time to achieve good solubility for gelatin in cold water. One area in particular where cold water solubility would be desirable is for the preparation of gelatin dessert mixes. There is a growing demand for all categories of food products which can be fully prepared and ready for consumption in the shortest period of time. The vast majority of gelatin dessert mixes which are currently available require the use of hot or boiling water to dissolve the gelatin and extended times, on the order of from about 2 to 4 hours, to permit them to achieve the proper consistency for eating. Thus, these products are often viewed as inconvenient because they require the use of hot or boiling water and also because of the extended setting time before they can be enjoyed. Because of this, many consumers who enjoy eating gelatin desserts and salads prepared with them forego their use because they perceive them as too inconvenient.

This problem was recognized by Hagerty in U.S. Pat. No. 2,803,548 wherein he disclosed that a room-temperature soluble gelatin could be prepared by drying a gelatin solution at reduced pressure within a relatively narrow temperature range of between 37° and 70° C. According to his procedure, an aqueous gelatin solution, preferably containing a sugar such as sucrose, was first prepared by heating and was then dried at the indicated temperatures at pressures of from 50 to 100 millimeters of mercury. The disclosure emphasizes the need to dry at the indicated temperatures at pressures of from 50 to 100 millimeters of mercury. The disclosure emphasizes the need to dry at the indicated temperatures and states where dextrose or corn syrup are substituted for the sucrose, a dense, rather than fluffy, product is produced. While the patent suggests that the material is soluble in cold water, no specific details as to water temperature or time for solution are given. The patent does indicate, however, that gel strength of products prepared according to the disclosure are about 10% less than those prepared by conventional techniques.

In U.S. Pat. No. 2,948,622, Cahn discloses that a hot solution comprising about one part gelatin, nine parts sugar and 10 parts water can be dried as a thin film, and that the dry product is soluble in cold tap water. Contrary to the disclosure of Hagerty, Cahn indicates that the temperature should be between 70° and 120° C. and the pressure should be near atmospheric. He indicates, however, that pressures down to about 0.75 atmospheres can also be employed. While the exact conditions of dissolution of the final product in cold water are not given, it is indicated that the product of at least one example can be dissolved in cold water and then fully set by cooling for about 45 minutes at a temperature of 10° C.

In addition to the batch drying process of Hagerty and the atmospheric drum drying process of Cahn, these two workers together disclosed in U.S. Pat. No. 2,841,498 that a cold water soluble gelatin could be prepared by spray drying an aqueous solution of sucrose and gelatin, provided that the sucrose content was at least 8 times, and preferably on the order of 9 or 10 times, the gelatin content. This disclosure is very specific as to the need for sugar to be sucrose and that the sucrose be present in a specific concentration. While other sugars such as dextrose and corn syrup solids are disclosed, they are mentioned only for admixture with the spray dried product. Cahn and Hagerty disclose that after dissolving their product in cold water, it sets to a gel within between about 7 to 15 minutes when cooled to about 32° F., and a solution at 75° F. when placed in an ordinary kitchen refrigerator sets to a firm gel therein in about one and one-half hours. It is disclosed that the acid component can be included prior to drying if desired.

In Canadian Pat. No. 896,965 to de Boer and U.S. Pat. No. 3,904,771 to Donnelly et al, there are described procedures for preparing various cold water soluble gelatin products by spray drying solutions comprising gelatin and an acid. Donnelly et al disclose that in addition to the acid which is employed at a level of from about 30 to 200% by weight of gelatin, the solution can contain a sugar such as fructose or sucrose prior to spray drying. In the Canadian patent, however, de Boer indicates that sugar can be eliminated from the spray drying solution where the acid is employed at a level of from about 5 to about 20% based upon the weight of the gelatin. According to de Boer, spray drying the dilutely acid gelatin solution permits the formation of fine droplets for enhanced drying.

According to the disclosure of Kalafatas in U.S. Pat. No. 3,927,221, the need for elaborate or extensive drying systems of the type described in U.S. Pat. Nos. 2,803,548, 2,841,498 and 2,948,622 can be obviated by the use of an extrusion process. According to this disclosure, the cold water soluble gelatin composition is prepared by subjecting a sugar/gelatin admixture to heat and pressure while applying shearing forces to the admixture in an extruder. The products are said to dissolve in water at about 50° F. after 2 minutes of spoon stirring. The solutions prepared in this manner are set after about two hours refrigeration, as compared to about four hours when hot water is used to dissolve conventional gelatin dessert mixes. The disclosure incidentally mentions the use of dispersants, wetting agents and emulsifiers to enhance dispersibility. Similarly, U.S. Pat. No. 2,819,970 to Steigmann and U.S. Pat. No. 2,819,971 to Gunthardt also mention the use of additives of this type.

Recently issued U.S. Pat. Nos. 4,401,685; 4,407,386; and 4,409,255 describe processes for the preparation of cold water soluble gelatins which possess markedly improved properties as compared with those previously known in the art. These patents all call for the use of a particular sugar composition, namely a mixture of corn syrup solids and maltodextrin, in combination with gelatin in a range of ratio of sugar to gelatin by weight of 2:1 to 12:1 preferably 3-7:1. An aqueous solution is prepared containing the gelatin, sugar, an acid and a surfactant and the solution is dried. In the '685 patent, the drying is effected by spreading a thin layer of the solution on a surface heated with steam at 10-60 psig pressure. In the '836 patent the solution is extruded as a foam and then dried.

It has now been found that cold water soluble gelatins having even more enhanced properties can be obtained by a modification of the processes described in the latter three patents set forth above, which modification is described in detail below.

SUMMARY OF THE INVENTION

It is an object of the present invention to provide a gelatin product which is completely dispersed and dissolved in cold water.

It is another object of the present invention to provide a cold water soluble gelatin product which, after dissolution in cold water, forms a gel of good strength and high quality in a conveniently short period of time.

It is another and more specific object of the present invention to provide a gelatin dessert mix which can be fully dissolved in tap water with vigorous spoon stirring and then set to a high quality dessert in a conveniently short period of refrigeration.

It is another object of the present invention to provide an improved process for preparing a cold water soluble gelatin product.

It is yet another and more specific object of the present invention to provide a process for preparing a cold water soluble gelatin product which is completely dissolved in cold tap water and is then fully set to form a high quality gel within a conveniently short period of refrigeration.

These and other objects are achieved according to at least the preferred embodiments of the present invention which provides a process for preparing a cold water soluble gelatin product, the product of that process, and a gelatin dessert mix which is fully soluble in cold water. The process according to the invention comprises: preparing an aqueous solution comprising water, gelatin, sugar consisting essentially of a hydrolyzed corn starch having a dextrose equivalent (DE) in the range of 20 to 36 (also referred to hereafter as "corn syrup") and an acid, and an amount of surface-active agent effective to increase dispersibility in the final product, and drying the solution so prepared.

The product of this process is useful in all applications where cold water solubility would be advantageous, and it is particularly useful in the preparation of gelatin dessert mixes which are fully soluble in cold water. The dessert mixes according to the present invention include acid, buffer, flavor and color, in addition to the cold water soluble gelatin prepared according to the process of the invention.

DETAILED DESCRIPTION OF THE INVENTION

The cold water soluble gelatin product prepared according to the present invention finds particular utility in gelatin dessert mixes, and will therefore be described in this environment as exemplary. This is not meant to imply, however, that other applications of the product are not intended. In fact, the products of the invention will be very useful in the preparation of salad dressings, ice cream, cake and pie mixes which require no baking, candies, and a wide variety of food products which currently employ gelatin or gelatin-like materials.

As a matter of definition, the term "cold water soluble" as used in the present application means that the product can be dissolved in tap water at the indicated concentration of usage in less than about 5 minutes, and preferably less than 1 minute, by stirring with a spoon to provide vigorous agitation. The temperature of tap water as delivered at the faucet can vary over a wide range generally from about 50° F. to about 70° F. although temperatures above and below this range can be encountered. The temperature of the tap water in any given instance can influence the rate at which a particular product of the invention will dissolve. Similarly, variation in mineral content of the tap water may also effect the rate at which the product dissolves.

The term "amorphous gelatin" as used herein means gelatin products which pass directly from the liquid solution to the dry state without forming a gelled state. Typically, amorphous gelatin products form clumps when mixed with cold water; however, these problems are alleviated according to the invention. Also by way of definition, all parts and percentages used throughout this disclosure are on a weight to weight basis, unless the contrary is indicated at the point of usage.

While the most important ingredient according to the present invention is gelatin, the particular type of gelatin employed is selected primarily based upon the intended use of the ultimate product, and not for any particular functionality of the gelatin within the process of the invention. Therefore, the cold water soluble gelatin products of this invention can be prepared from gelatins of either the Type A (acid) or Type B (alkali) forms. Similarly, the gelatin can be prepared from any collagen source including bone, hide and other collagen sources and can be derived from any suitable animal, including beef and pork sources. The bloom will typically be within the range of from about 150 to 275.

According to the process, an aqueous solution comprising gelatin and hydrolyzed corn starch is applied in a thin layer to a drying surface and is then dried under reduced pressure to provide a product which is preferably flaky and of low density. While any apparatus capable of performing the drying operation can be employed, vacuum drum dryers are capable of handling high volumes of material at practical solids concentrations to achieve rapid drying at low applied pressure.

To prepare the solution comprising gelatin and hydrolyzed corn starch for drying, the two latter components are heated in the desired concentration in water, preferably to a temperature of about 150° to 180° F., to achieve complete solution. Typically, this is conducted by dissolving the gelatin in hot water first and then adding the liquid corn syrup to the gelatin solution. Advantageously, a gelatin solution from a gelatin production process, typically containing about 15 to 20% gelatin can be mixed with corn syrup to achieve the desired concentration. The gelatin concentration is typically within the range of from about 5 to about 25% and the corn syrup solids concentration is typically within the range of from about 20 to about 80%, based on the weight of the total solution. The ratio of corn syrup solids to gelatin is critical from a processing standpoint. Advantageously, the ratio is within the range of from greater than 2:1 up to about 12:1, and preferably is within the range of from about 3:1 to about 7:1. The total solids concentration of the solution for drying, including the corn syrup solids, gelatin and any other solid materials, is advantageously within the range of from about 30 to about 70%. A particularly useful concentration of total solids is of the order of 60%.

One of the principal differences between the processes described in the prior art and the process of the invention is the utilization, as the sugar component of the aqueous composition which is to be dried, of a hydrolyzed corn starch having a DE of about 20 to about 36 and being substantially free i.e., containing less than 10% of related starch hydrolysis products particularly maltodextrin. In the aforesaid U.S. Pat. Nos. 4,401,685; 4,407,836 and 4,409,255, the sugar component comprised a mixture of which the chief components are maltodextrin (DE 1-23) and corn syrup solids (DE 23-42). It has now been found that the use of the corn syrups alone, in the absence of maltodextrin, gives rise to a significant improvement in the properties of the cold water soluble gelatin produced as the end product of the process. The nature of these improved properties will be discussed in detail hereinafter. A particularly preferred sugar component for use in the preparation of cold water soluble gelatins in accordance with this invention is a hydrolyzed corn starch having a DE of about 24 to about 30 and a most preferred sugar component is a hydrolyzed corn starch having a DE of about 26.

In addition to the gelatin and the sugar, the aqueous solution for drying must also comprise an acid suitable for food use such as fumaric, citric, malic, adipic, ascorbic, tartaric, succinic, and phosphoric acids. Among these, fumaric, citric and adipic acids are preferred. The acid, when employed, is found to improve final product solubility and advantageously is present in a ratio of acid to gelatin within the range from about 0.05-0.05:1. More preferred ratios of acid to gelatin are within the range of from about 0.10-0.23:1 which range significantly improves product solubility and can provide all the acid that is required for a good tasting gelatin dessert. It may sometimes also be desirable to employ a suitable buffer such as a sodium or potassium salt of any of the above mentioned acids. The pH of the dessert may be adjusted to within the range of from about 3 to about 4.5 by use of the buffering salts.

In carrying out the process of the invention the acid can be incorporated directly into the aqueous solution at the same time as the gelatin and sugar are introduced therein in the manner described above. However, as explained more fully below, the acid can be introduced at later stages of the process of the invention provided that the acid is always introduced at a stage preceding the drying step.

According to a preferred embodiment of the invention, the solution prior to drying also contains a surface-active agent, such as those known generically to the art as polysorbates, hydroxylated lecithin, acetylated mono-glycerides, succinylated monoglycerides, ethoxylated mono- and diglycerides, sodium stearoyl 2-lactylate and the like. These surface-active agents will be employed in amounts effective to render the dried product more easily dispersible in cold water. Exemplary of the polysorbate surface-active agents are polysorbate 60, polysorbate 65 and polysorbate 80. Polysorbate 60 is identified chemically as polyoxyethylene (20) sorbitan monostearate while polysorbate 65 is known as polyoxyethylene (20) sorbitan tristearate, and polysorbate 80 is known as polyoxyethylene (20) sorbitan monooleate. In addition to these materials, other surface-active agents which have the ability of increasing the dispersibility of the final product in cold water can also be employed. While the exact level of addition will be controlled based upon a balance between cost, effectiveness and taste, it is preferred to maintain the level within the range of from about 0.05 to about 7% based upon the weight of the gelatin to provide the desired degree of improvement in dispersibility without adversely affecting the ultimate rate of set or gel strength of the cold water soluble gelatin product produced according to the process of the invention.

In accordance with an optional, but preferred, embodiment of the invention the aqueous solution comprising corn syrup solids, gelatin and other components discussed above is subjected to a heat treatment prior to drying. In this embodiment, the said aqueous solution, which has usually been brought to a temperature of the order of 150° to 180° F. in order to obtain a clear solution, is maintained at at least one temperature in the range of about 110° F. to about 180° F. for a holding period of time not less than about 1 hour and preferably, not more than about 48 hours. The precise temperature and time to be employed in any given instance will vary depending upon the particular combination of gelatin and corn syrup employed. The most advantageous temperature and time to be employed in any given instance can be readily determined by a process of trial and error.

A number of alternative ways of carrying out this heat treatment (using any conventional heating equipment) can be employed. Thus, in one alternative, the holding period is carried out at a temperature in the higher end of said temperature range, and preferably at a temperature of about 160° F., for a holding period within the above stated range, preferably a holding period of up to about 4 hours. When the holding period is complete the solution is then cooled, or allowed to cool, to a temperature of about 115° F. prior to being submitted to the drying step. In another alternative form of heat treatment the solution, after having been formed initially at a temperature of about 150° F. to about 160° F., is then cooled or allowed to cool to a temperature in the range of about 115° F. to 130° F. and maintained thereat for a holding period within the above stated range of about 1 to 48 hours. In this particular alternative form of heating step the holding period is longer than is normally required in the previous alternative method and is generally in the order of up to about 24 hours. In a further alternative the aqueous solution can be submitted to two separate holding periods one of which is at a temperature in the higher end of the above range and the other of which is at a temperature in the lower end of said range.

Irrespective of which of the above alternatives is employed the acid which, as discussed above, is required to be present during the subsequent drying step can be incorporated in the aqueous solution either initially (i.e. during the initial formation of the solution) or prior to the holding period, or after the holding period and just prior to the subsequent drying step.

The inclusion of this heat treatment step in preparing cold water soluble gelatins in accordance with the invention gives rise to a product which, on admixture with cold water, forms a gel having improved clarity.

After preparing the aqueous solution comprising gelatin, sugar, and any additional materials desired according to the above disclosure, and optionally subjecting the solution to heat treatment as described above, the solution is applied in a thin layer to the surface of a suitable dryer, such as the Buflovak double drum vacuum drum dryer or vacuum drum dryer of similar type. Typically, the thickness of the layer will be within the range of from about 0.1 to about 3.0 millimeters. The surface of the dryer is preferably heated from the reverse side by steam to a temperature effective for drying the solution within a commercially practical period of time while maintaining the gelatin in the amorphous state. Typically, the residence time of the solution on the drying surface from the time of application to the time of complete drying will be less than about 5 minutes, preferably less than about 1 minute. Steam at a pressure of from about 5 to about 60 psig will be effective for supplying adequate heat. More typically, the steam pressure will be within the range of from about 5 to about 20 psig.

The solution is dried on the surface under a reduced pressure. Absolute pressures of less than about 5 inches of mercury are effective. The reduced pressure causes rapid volatilization of the water within the solution and creates a light, friable, flaky product which exhibits good cold water solubility immediately after removal from the surface by means of a knife-edged scraper blade or other suitable means. It is preferred, however, to further reduce and classify the particle size of the dried cold water soluble gelatin product to a more uniform size such as by grinding and screening. The dried material is preferably ground or otherwise comminuted and classified to a particle size of from about 20 to about 200 U.S. series mesh. Preferably the particle size is such that at least about 90 percent of the particles will pass through 30 U.S. mesh and most will be retained on 200 U.S. mesh. This decrease in particle size compared with products previously described yields a cold water soluble gelatin having improved dispersibility and solubility. Most preferably, at least 40 percent of the particles will pass through 100 U.S. mesh.

Preferred bulk densities for the dry cold water soluble gelatin product of the invention will be within the range of from about 0.2 to about 0.3 grams per cubic centimeter.

The cold water soluble gelatins prepared in accordance with the present invention possess significantly improved solubility and more rapid dispersibility in water and give rise to gels with improved clarity as compared with the products prepared in accordance with prior art procedures including those described in U.S. Pat. Nos. 4,401,685; 4,407,836 and 4,409,255. These improvements in properties of the cold water soluble gelatins are illustrated by the data set forth in the specific examples below.

The dried cold water soluble gelatin product prepared according to the process of the invention can be compounded with other typical ingredients of dry gelatin dessert mixes to prepare a gelatin dessert mix which is, itself, cold water soluble. Typically, the dry gelatin dessert mix prepared according to the invention will comprise the cold water soluble gelatin plus additional amounts of sweeteners, acidulents, buffers, flavors, antifoaming agents, and colors for the desired effect in the final product. Where these materials are not added to the solution prior to drying, they can be added by dry mixing with the cold water soluble gelatin product after drying by simple dry blending or by blending and agglomeration. Typically where the sugar employed in the dessert is sucrose, the ratio of sucrose to gelatin will be within the range of from about 9-15:1. And, where the acid is fumaric acid, the ratio of acid to gelatin will be within the range of from about 0.10-0.23:1. The buffer is preferably employed in an amount effective to adjust the pH of the final product to within the range of from about 3 to about 4.5. The flavorants and colorants are used in widely varying amounts, depending upon the desired end effect. The cold water soluble gelatin dessert can also contain vitamin and mineral supplements if desired.

The following examples are intended to further illustrate and explain the present invention but are not be taken as limiting in any regard:

EXAMPLE 1

This example describes the preparation of a cold water soluble gelatin product according to the invention. A solution is prepared by admixing the following materials.

| Ingredients | Parts |
| --- | --- |
| Corn syrup 26DE (77.5% solids) | 508 |
| Beef gelatin 240 + bloom (91% solids) | 97 |
| Fumaric acid | 16.5 |
| Polysorbate 60 | 2.5 |
| Water | 210 |
| Corn syrup (solids): gelatin (solids) ratio | 4.5:1 |

The above ingredients are mixed and heated in a steam jacketed kettle to a temperature of about 160° F. while agitating using a Lightnin Mixer and the mixture is held at 160° F. for about 5 minutes until all the solids are fully dissolved. Thereafter the solution (solids content about 60%) is cooled to about 115° F. and maintained at this temperature while it is fed slowly into a double drum steam heated vacuum dryer in which a thin film of the solution is applied to the rolls which have been adjusted to provide a gap of about 0.01 inches there between. The drum dryer is operated using a steam pressure on the rolls of 10-15 psig and an overall vacuum gauge of about 26-27 ins. of mercury in the drying chamber. The dried product is scraped continuously from the rolls using a doctor blade and the dried, flaky, cold water soluble gelatin is collected. The dried material is then ground gently in a slow speed rotating disc grinder and sifted through a 30 U.S. mesh screen to provide a cold water soluble gelatin powder. The resulting powder was found to have a moisture content of 1.73 percent and to have the following particle size distribution.

| Screen | grams | percent by wt. |
| --- | --- | --- |
| on #40 | 3.6271 | 7.25 |
| #50 | 7.9536 | 15.92 |
| #60 | 4.2766 | 8.55 |
| #100 | 10.6115 | 21.22 |
| #140 | 7.1743 | 14.35 |
| Pan | 16.3569 | 32.71 |
| Total | 50.0000 | 100.00 |

EXAMPLE 2

This example describes the preparation of additional cold water soluble gelatin products according to the invention using the same formulation set forth in Example 1 but varying the ratio of Corn syrup solids (26DE) to gelatin from a high of 5.38:1 to a low of 2.83:1 and keeping constant the amounts of fumaric acid, polysorbate 60 and water. The actual amounts of corn syrup and gelatin used in each case are as follows.

| Run No | Parts Corn syrup* | Gelatin | Ratio* |
|---|---|---|---|
| 2A | 523.87 | 82.87 | 5.38:1 |
| 2B | 491.61 | 110.50 | 3.79:1 |
| 2C | 475.48 | 124.31 | 3.26:1 |
| 2D | 459.35 | 138.12 | 2.83:1 |

*77.5% solids
**91% solids
***based on solids

EXAMPLE 3

This example illustrates the preparation of cold water soluble dry gelatin dessert mixes from the cold water soluble gelatins prepared as described in Examples 1, 2A, 2B and 2C. The ingredients and proportions used in all cases are as follows:

| Ingredient | Parts |
|---|---|
| Cold water soluble gelatin | 39.43 |
| Cold water soluble fumaric acid | 0.38 |
| Sugar | 43.64 |
| Sodium citrate | 1.30 |
| Ascorbic acid | 0.05 |
| Spray dried flavor | 0.16 |
| F D and C color | 0.04 |
| Antifoam agent | 0.20 |

The above ingredients are dry blended into a homogeneous blend to provide the cold water soluble dry gelatin dessert mix. A gelatin dessert is prepared by adding 16 fluid ounces of cold water at about 55° F. to the dessert mix prepared as described above and stirring for 3 minutes with a spoon. The resulting solution is then placed in dessert cups and put into a conventional refrigerator at about 42° F. The solution is then held for a period of about one hour. The finished gelatin desserts so prepared exhibit smooth, spoonable gels and are of a consistency suitable for consumption.

The following tests were carried out in respect of each of the desserts so prepared.

Dispersion time: The time (in seconds) required for the sample to disperse in water at 55° F. under standardised conditions.

Amount of surface skin: Depth of skin (in millimeters) on the surface of the solution after dispersion of the mix in water under standardised conditions.

Foam rating: Visual rating on a scale of 1=excellent (no foam) to 5=poor (much foam) of mix dispersion in water.

Penetrometer: Distance (millimeters) of penetration by 25 g. inverted cone under gravity into the surface of the following gels prepared from a test mix:
(a) gel formed in bloom cup and allowed to stand in 10° bath for 1 hr.
(b) same as (a) after standing for 1.5 hr.
(c) gel ("dish") formed in cup surmounted by an inverted dish taped in place: gel surface above the cup rim is sliced off to expose the inner layer of gel for the test.
(d) gel ("cup") prepared in dessert cup without removal of surface skin.

The following results were obtained.

| Cold water gelatin | Dispersion time:secs | Surface skin mm. | Foam Rating | 10° 1 hr | Penetrometer Reading (mm) Bath 1.5 hr | Dish 1 hr | Cup 1 hr |
|---|---|---|---|---|---|---|---|
| Ex. 1 | 6 | 0.50 | 2.5 | 223 | 201 | 201 | 209 |
| Ex. 2A | 9 | 0.50 | 2.0 | 215 | 197 | 242 | 213 |
| 2B | 10 | 0.50 | N.T. | 237 | 210 | 257 | 212 |
| 2C | 8 | 2.0 | 2.5 | 214 | 210 | 258 | 213 |
| 2D | 17 | 3.5 | 2.0 | 197 | 190 | 256 | 211 |

It will be seen that, as the ratio of corn syrup to gelatin decreases to the 3.26:1 level (Ex. 2C), the amount of undesirable skin increases and, at the 2.83:1 level (Ex. 2D), the dispersion time has increased significantly together with the skin level.

EXAMPLE 4

This example describes the preparation of further cold water soluble gelatin products according to the invention. Solutions are prepared by admixing the following materials.

| Ingredients | Parts by wt. |
|---|---|
| Corn syrup solids (26 DE:77.5% solids) | 1012.26 |
| Beef gelatin 240 + bloom (90.5% solids) | 193.38 |
| Fumaric Acid | 33.00 |
| Tween 60 (Polysorbate 60) | 7.50 |

The above ingredients are dry blended and the resulting mixture is divided into two equal portions. One portion (Run 4A) is treated exactly as described in Example 1 to prepare a cold water soluble gelatin. The other portion (Run 4B) is treated in exactly the same manner with the sole exception that the solution, after heating to 160° F. and cooling to 115° F., is held at about 112° F. for a total of 20 hours before being subjected to the drying operation.

EXAMPLE 5

This example describes the preparation of further cold water soluble gelatin products according to the invention. Solutions are prepared by admixing the following materials.

| Ingredients | Parts by wt. |
|---|---|
| Corn syrup solids (26 DE:77.5% solids) | 1029.00 |
| Beef gelatin 240 + bloom (90.5% solids) | 193.38 |
| Fumaric Acid | 20.00 |
| Tween 60 | 7.50 |

The above ingredients are dry blended and the resulting mixture is divided into two equal portions. One portion (Run 5A) is treated exactly as described in Example 1 (using 208.39 parts of water) with the sole exception that the solution, after heating to 160° F. and cooling to 115° F., is held at about 112° F. for 4 hours before being subjected to the drying operation. The other portion (Run 5B) is treated in exactly the same manner except that the hold time is 22 hours at a temperature of about 118° F.

EXAMPLE 6

This example describes the preparation of further cold water soluble gelatin products according to an alternative embodiment of the invention. Solutions are prepared by mixing the following ingredients.

| Ingredients | Parts by wt. |
|---|---|
| Corn syrup (26 DE:77.5% solids) | 1582.26 |
| Beef gelatin 240 + bloom (90.5% solids) | 290.07 |
| Tween 60 | 11.25 |

The above ingredients are dry blended and the resulting mixture is divided into three equal portions. One portion (Run 6A) is admixed with 205.47 parts of water and the mixture is heated to about 160° F. using the process and equipment described in Example 1. When all the solids are fully dissolved the solution is cooled to about 115° F. and 16.5 parts of fumaric acid is added. The resulting solution is then dried using the procedure and equipment described in Example 1 to provide the cold water soluble gelatin as a dry powder.

A second portion (Run 6B) of the dry blend is then treated in exactly the same manner with the sole exception that the solution, after cooling and prior to the addition of the fumaric acid, is held at about 128° F. for a period of 21 hours.

A third portion (Run 6C) of the dry blend is then treated in exactly the same manner as Run 6B except that the hold period is 25 hours rather than 21 hours.

EXAMPLE 7

This example describes the preparation of a further cold water soluble gelatin product (Run 7) according to an alternative embodiment of the invention. A solution was prepared from the following ingredients.

| Ingredients | Parts by wt. |
|---|---|
| Corn syrup (26 DE:77.5% solids) | 506.13 |
| Beef gelatin 240 + bloom (90.5% solids) | 96.69 |
| Tween 60 | 3.75 |

The above ingredients are dry blended and mixed with 210.26 parts of water. The mixture is heated to about 160° F. using the process and equipment described in Example 1. When all the solids are fully dissolved the solution is cooled to about 120° F. and maintained at that temperature for a total of 3 hours. At the end of this period 16.5 parts of fumaric acid are added and immediately thereafter the resulting solution is dried using the procedure and equipment described in Example 1 to provide a cold water soluble gelatin as a dry powder.

EXAMPLE 8

This example illustrates the preparation and properties of dry gelatin dessert mixes and desserts prepared from each of the cold water soluble gelatins of Examples 4 to 7, inclusive. Each of the dessert mixes and desserts is prepared using the procedure and ingredients set forth in Example 3 but replacing the cold water soluble gelatin there used by an equal amount of the appropriate cold water soluble gelatin of Examples 4 to 7. The finished gelatin desserts so prepared, with the exception of that prepared from Run 8C, exhibit smooth, clear spoonable gels and are of a consistency suitable for consumption. The dessert prepared from cold water soluble gelatin Run 6C exhibited slight pebbling but was acceptable in all other respects.

The four tests described in Example 3 are carried out on each of the above dessert mixes and desserts with the following results.

| Cold water gelatin | Dispersion time:secs | Surface skin mm. | Foam Rating | 10° 1 hr | Penetrometer Reading (mm) Bath 1.5 hr | Dish 1 hr | Cup 1 hr |
|---|---|---|---|---|---|---|---|
| Ex. 4A | 14 | 0 | 1.0 | 219 | 205 | 242 | 213 |
| 4B | 5 | 0 | 1.0 | 256 | 234 | 294 | 252 |
| 5A | 12 | 0 | 1.0 | 220 | 214 | 259 | 228 |
| 5B | 7 | 0 | 1.0 | 249 | 244 | 289 | 276 |
| 6A | 9 | 0 | 1.0 | 241 | 220 | 273 | 248 |
| 6B | 8 | 0 | 1.0 | 251 | 235 | 288 | 256 |
| 6C | 6 | 0 | 1.0 | 269 | 254 | 302 | 273 |
| 7 | 6 | 0 | 2.0 | 243 | 224 | 277 | 238 |

What is claimed is:

1. A process for preparing a cold water gelatin product comprising:
   preparing an aqueous solution comprising water, gelatin, a sugar consisting essentially of a hydrolysed corn starch having a dextrose equivalent in the range of about 24 to 30, an acid, and an amount of surface-active agent effective to increase dispersibility in the final product; the ratio by weight of said sugar to gelatin being in the range of about 3:1 to about 7:1, the amount of said acid being about 0.05 to about 0.5 parts by weight per part by weight of gelatin and the total solids concentration of said solution being in the range of about 30 to about 70% by weight; and
   drying the solution so prepared.

2. A process according to claim 1 wherein the drying is accomplished using a vacuum drum dryer.

3. A process according to claim 1 wherein the acid is selected from the group consisting of fumaric, adipic and citric acids.

4. A process according to claim 1 wherein the surface-active agent comprises a member selected from the group consisting of polyoxyethylene (20) sorbitan monostearate, polyoxyethylene (20), sorbitan monooleate, polyoxyethylene (20) sorbitan tristearate, and mixtures thereof.

5. A process according to claim 1 wherein the weight ratio of acid to gelatin is within the range of about 0.10:1 to 0.23:1.

6. A cold water soluble gelatin product produced in accordance with the process of claim 1.

7. A gelatin dessert mix comprising a cold water soluble gelatin product prepared in accordance with the process of claim 1, an acid, a buffer, antifoaming agent, flavoring material and coloring material.

8. A gelatin dessert mix according to claim 7 wherein the buffer is employed in an amount effective to adjust the pH of an aqueous solution of the gelatin dessert mix to a value within the range of about 3 to about 4.5.

9. A gelatin dessert mix according to claim 7 wherein additional sugar is admixed therein to bring the total sugar to gelatin ratio by weight within the range of about 8:1 to 15:1.

10. A gelatin mix according to claim 7 wherein the cold water soluble gelatin product has a bulk density of about 0.2 to about 0.3 grams per cubic centimeter.

11. A gelatin dessert mix according to claim 7 which is capable of completely dissolving in tap water in less than about 5 minutes with vigorous stirring.

* * * * *